United States Patent
Saitoh et al.

(10) Patent No.: US 7,629,546 B2
(45) Date of Patent: Dec. 8, 2009

(54) LOAD SENSOR

(75) Inventors: Yukihiro Saitoh, Kariya (JP); Hiroyuki Itoh, Chita (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/998,086

(22) Filed: Nov. 28, 2007

(65) Prior Publication Data

US 2008/0121511 A1    May 29, 2008

(30) Foreign Application Priority Data

Nov. 29, 2006    (JP) ............................. 2006-321938
Aug. 8, 2007     (JP) ............................. 2007-206934

(51) Int. Cl.
H01H 35/00    (2006.01)
(52) U.S. Cl. .................. 200/85 A; 200/85 R; 340/667; 280/734
(58) Field of Classification Search ............... 200/85 A; 701/45; 280/734–735; 340/666–667
See application file for complete search history.

(56) References Cited

U.S. PATENT DOCUMENTS

| 5,612,876 | A  | 3/1997  | Zeidler et al.   |
| 5,720,277 | A  | 2/1998  | Olsson et al.    |
| 5,896,090 | A  | 4/1999  | Okada et al.     |
| 5,948,031 | A  | 9/1999  | Jinno et al.     |
| 6,505,521 | B1 | 1/2003  | Petri et al.     |
| 7,162,344 | B2 | 1/2007  | Kojima et al.    |
| 2004/0012499 | A1 | 1/2004 | Giesel et al.   |
| 2004/0075259 | A1 | 4/2004 | Baba et al.     |
| 2006/0278513 | A1 | 12/2006 | Kawahira et al. |
| 2009/0013802 | A1 | 1/2009 | Orlewski et al. |

FOREIGN PATENT DOCUMENTS

| DE | 38 05 887     | 9/1989  |
| DE | 196 01 969    | 7/1997  |
| DE | 101 43 326    | 3/2003  |
| DE | 102 15 390    | 10/2003 |
| EP | 1 591 321     | 11/2005 |
| EP | 1 821 088     | 8/2007  |
| JP | 10-039045     | 2/1998  |
| JP | 11-297153     | 10/1999 |
| JP | 2003-011710   | 1/2003  |

(Continued)

OTHER PUBLICATIONS

Office action dated Jul. 14, 2008 in German Application No. 10 2007 056238.3 with English translation.

(Continued)

*Primary Examiner*—Kyung Lee
(74) *Attorney, Agent, or Firm*—Harness, Dickey & Pierce, PLC

(57) ABSTRACT

A load sensor is provided as a seat sensor that includes a first film formed in a linear shape, a second film formed in the same shape as the first film and arranged facing the first film, sensor electrodes arranged between the first film and the second film facing each other. The electrodes are normally spaced apart from each other and come in contact with each other upon receiving a load. The electrodes are connected to a connector through a conducting portion arranged between the first film and the second film. The seat sensor is disposed on a seat where a large compressive force is applied by a passenger.

11 Claims, 4 Drawing Sheets

FOREIGN PATENT DOCUMENTS

| | | |
|---|---|---|
| JP | 2005-233845 | 9/2005 |
| JP | 2005-257556 | 9/2005 |
| JP | 2005-268169 | 9/2005 |
| JP | 2006-172730 | 6/2006 |
| JP | 2006-317340 | 11/2006 |
| WO | WO 97/30864 | 8/1997 |

OTHER PUBLICATIONS

Office action dated Jul. 14, 2009 in corresponding German Application No. 10 2007 056238.3 with English translation.
Office action dated Sep. 11, 2009 in corresponding Chinese Application No. 2007 10168198.4.

LOAD SENSOR

CROSS REFERENCE TO RELATED APPLICATION

This application is based on and incorporates herein by reference Japanese Patent Applications No. 2006-321938 filed on Nov. 29, 2006 and No. 2007-206934 filed on Aug. 8, 2007.

FIELD OF THE INVENTION

This invention relates to a load sensor and, particularly, to a load sensor having sensor electrodes arranged between a pair of films being spaced apart from each other and facing each other so as to come in contact and conductive to each other upon receiving a load.

BACKGROUND OF THE INVENTION

Various load sensors are proposed in, for example, JP 10-39045A and U.S. Pat. No. 7,162,344 (JP 2005-153556A). According to these load sensors, a plurality of sensor cells is arranged like a matrix and occupies a region not less than one-half of all the seat surface of a seat of a vehicle. Electrodes are interposed between a pair of films.

In these load sensors, however, the pair of films occupy large areas. Therefore, formation of the pair of films is expensive. Besides, of the films, a rectangular portion on which the sensor cell is arranged and a portion that connects to the connector are narrowly formed. If a plurality of films is cut out of a large base film material, therefore, the peripheries of the connection portions are wasted. That is, in forming the film, a drop in the yield of the base film material results in an increase in the cost.

SUMMARY OF THE INVENTION

It is therefore an object of the present invention to provide a load sensor in the form of a film, which can be produced in reduced cost.

According to one aspect of the present invention, a load sensor comprises a first film, a second film, sensor electrodes, conductor electrodes and a connector. The first and second films are formed in the same linear shape and arranged to face each other. The sensor electrodes are arranged between the first film and the second film to form a sensor cell. The sensor electrodes are normally spaced apart from each other and come in contact with each other upon receiving a load. The conducting electrodes are arranged between the first film and the second film, and conductive to the sensor electrodes. The connector is coupled to ends of the first film and the second film to be conductive to the sensor electrodes via the conducting electrodes.

Preferably, the sensor cells are positioned only at a predetermined part of a seat, which receives more compressive force of a passenger than other parts of the seat. The predetermined part of the seat is at least one of a lower part of a backrest, an upper part of the backrest and a rear part of a seat surface of the seat.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
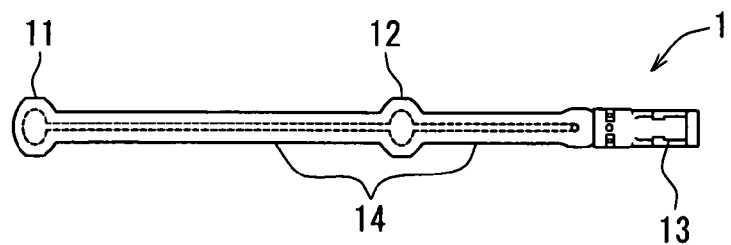
FIG. 1 is a plan view of a seat sensor including a load sensor according to a first embodiment of the present invention.
Figure 3:
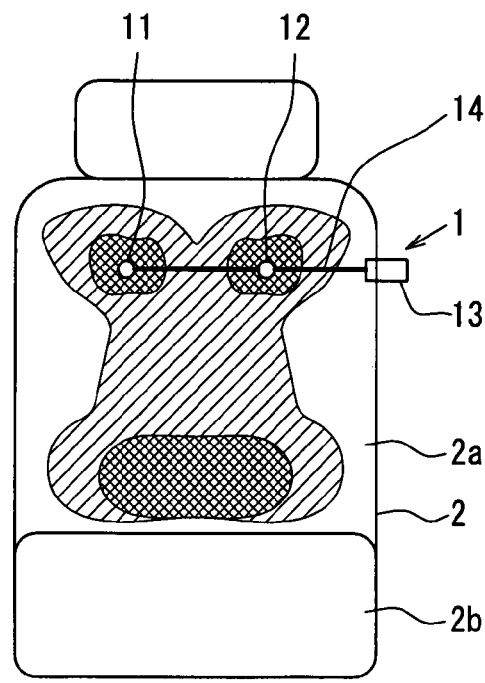
FIG. 3 is a front view of the seat sensor mounted on a seat, as viewed from the front side of a vehicle, according to the first embodiment.

Referring first to FIG. 1, a load sensor is provided in a seat sensor 1, which may be mounted on a seat 2 of a vehicle as shown in FIG. 3 to detect whether a passenger is seated on the seat 2. The seat sensor 1 is constructed with two sensor cells 11 and 12, a connector 13, and a linear conducting portion 14 electrically connecting the sensor cells 11 and 12 to the connector 13. The sensor cells 11 and 12 operate as switches that are turned on and rendered conductive upon receiving a load, which may be a passenger or a luggage. The connector 13 has two terminals connected to the sensor cells 11 and 12 through the conducting portion 14, and is connected to a detection ECU (electronic control unit) mounted on the vehicle. The conducting portion 14 is formed to extend straight from the connector 13. The sensor cells 11 and 12 are arranged at an end of the linear conducting portion 14 and at the central portion of the conducting portion 14.

Figure 2:
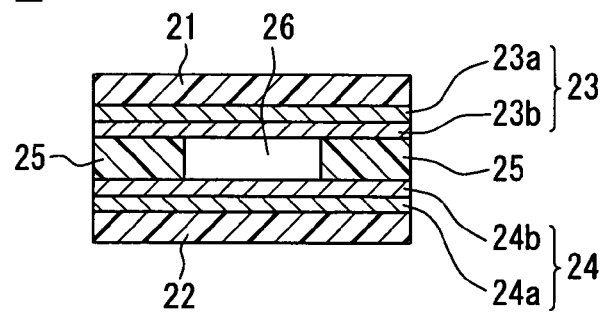
FIG. 2 is an enlarged sectional view of a portion of a sensor cell in the seat sensor according to the first embodiment.

As shown in FIG. 2, the seat sensor 1 is constructed with a first film 21, a second film 22, a first electrode 23, a second electrode 24 and a spacer 25. In the seat sensor 1, however, the sensor cells 11, 12 and the conducting portion 14 share the basic structures, though the structures are slightly different. Described below, therefore, are differences among the sensor cells 11, 12 and the conducting portion 14.

The first film 21 is enlarged to form an outer shape of the sensor cells 11, 12 and the conducting portion 14, and is linearly formed as a whole. The first film 21 is made from a PEN resin and is thin. The first film 21 is of a nearly circular shape at the front end and at the central portion, i.e., at the portions of the sensor cells 11 and 12. In the first film 21, the part corresponding to the conducting portion 14 is linearly formed having a width smaller than the diameter of the circular portions. The connector 13 is bonded to the proximal end of the first film 21. The second film 22 is made from the same material as the first film 21 and has the same shape as the first film 21. The second film 22 is arranged to face the first film 21. The proximal end of the second film 22 is bonded to the connector 13 like that of the first film 21.

The first electrode 23 is formed, as a sensor electrode and a conducting electrode, on one surface (inside surface) of the first film 21. That is, the first electrode 23 is arranged on the upper side in FIG. 2 between the first film 21 and the second film 22. The first electrode 23 comprises a silver layer 23a adhered on the inside surface of the first film 21 and a carbon layer 23b covering the inside surface of the silver layer 23a. The first electrode 23 at the portions of the sensor cells 11 and 12 is formed on at least the center portions of the first film 21 of the circular shape. The first electrode 23 at the conducting portion 14 is suitably wired depending upon a circuit to be formed.

The second electrode 24 is formed, as a sensor electrode and a conducting electrode, on the second film 22 on the inside surface facing the first electrode 23. That is, the second electrode 24 is formed between the first electrode 23 and the second film 22. The second electrode 24 comprises a silver layer 24a adhered on one surface (inside surface) of the second film 22 and a carbon layer 24b covering the surface of the silver layer 24a. Further, the carbon layer 24b of the second electrode 24 is arranged away from the first electrode 23.

The second electrode 24 at the portions of the sensor cells 11 and 12 is formed on at least the center portion of the second film 22 of the circular shape. Namely, at the portions of the sensor cells 11 and 12, the first electrode 23 and the second electrode 24 are enlarged, face each other and are spaced away from each other. Further, the second electrode 24 in the conducting portion 14 is suitably wired depending upon a circuit to be formed. That is, the first electrode 23 and the second electrode 24 in the conducting portion 14 electrically connect the first electrode 23 and the second electrode 24 at the portions of the sensor cells 11 and 12 to both terminals of the connector 13.

The spacer 25 has the same outer shape as those of the first film 21 and the second film 22. However, the center portion of the spacer 25 is penetrated entirely in the direction of width thereof as indicated by a broken line in FIG. 1. The spacer 25 is penetrated through more widely in the portions of the sensor cells 11 and 12 than in the conducting portion 14. The spacer 25 is made from the PET resin and thin.

The spacer 25 is interposed between the first electrode 23 and the second electrode 24. That is, the first electrode 23, second electrode 24 and spacer 25 define a space therein. Here, the spacer 25 is penetrated more widely in the portions of the sensor cells 11 and 12 than in the conducting portion 14. Therefore, the space 26 in the sensor cells 11 and 12 has a width (width in the left-and-right direction in FIG. 2) larger than that of the space in the conducting portion 14. Therefore, if the sensor cells 11 and 12 having a wider space receive a compressive load in the up-and-down direction in FIG. 2, the first film 21, second film 22, first electrode 23 and second electrode 24 undergo deflection, and the first electrode 23 and the second electrode 24 come in contact with each other and are rendered conductive. That is, upon receiving the compressive load, the first electrode 23 and the second electrode 24 are rendered conductive to each other at the portions of the sensor cells 11 and 12 operating as a switch. The space 26 in the conducting portion 14 operates as a passage for venting air. That is, the space 26 in the conducting portion 14 is for venting the internal air when the spaces 26 in the sensor cells 11 and 12 are compressed. Thus, the first electrode 23 and the second electrode 24 are enabled to easily contact each other in the sensor cells 11 and 12 when a compressive load is applied thereto.

The seat sensor 1 may be mounted on the seat 2 as shown in FIG. 3. Here, a shaded portion (single hatching portion) in FIG. 3 represents an area (upper part) where a backrest 2a receives a load when a passenger is seated on the seat 2. In particular, the lower side of a dark portion (cross hatching portion) in the shaded portion is a portion corresponding to the buttocks of the passenger. The left-and-right two portions on the upper part of the dark portions are the portions corresponding to the shoulder bones of the passenger. The dark portion represents an area where the backrest 2a receives a large load as compared to the shaded portions corresponding to other portions of the back of the passenger.

The seat sensor 1 is mounted on only the upper part of the backrest 2a of the seat 2 to extend in a horizontal direction or left-and-right direction in the vehicle. The seat sensor 1 is arranged between an inside cushion (not shown) of the backrest 2a and a surface cloth (not shown). More specifically, the sensor cells 11 and 12 of the seat sensor 1 are arranged at positions over the central portion of the backrest 2a in the up-and-down direction of the vehicle and deviated to the left-and-right from the center portion in the left-and-right direction of the vehicle. The sensor cells 11 and 12 are arranged at the same height. Namely, the seat sensor 1 is horizontally arranged.

The sensor cells 11 and 12 of the seat sensor 1 are arranged at the portions of the left-and-right shoulder bones of the passenger when the passenger is seated on the seat 2 in a proper attitude, so that when the passenger is seated on the seat 2 in the proper attitude, the sensor cells 11 and 12 are both rendered conductive. The connector 13 is arranged to be positioned on one side (e.g., left side) of the vehicle relative to the sensor cells 11 and 12.

Figure 4A:
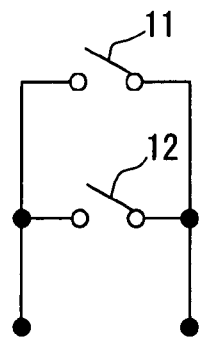
FIGS. 4A and 4B are circuit diagrams of the seat sensor according to the first embodiment.
Figure 4B:
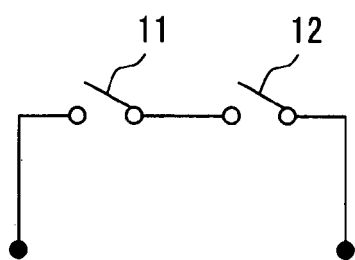

Next, the sensor cells 11 and 12 may be arranged as shown in FIGS. 4A and 4B. In the case of FIG. 4A, the sensor cell 11 at the end of the conducting portion 14 is connected in parallel with the sensor cell 12 at the center portion of the conducting portion 14. Either one of the first electrode 23 or the second electrode 24 in the sensor cell 11 and either one of the first electrode 23 or the second electrode 24 in the sensor cell 12 are connected to the one terminal of the connector 13. Further, the other one of the first electrode 23 or the second electrode 24 in the sensor cell 11 and the other one of the first electrode 23 or the second electrode 24 in the sensor cell 12 are connected to the other terminal of the connector 13. That is, when at least either one of the sensor cell 11 and 12 is rendered conductive, the two terminals of the connector 13 are rendered conductive.

In the case of FIG. 4B, the sensor cell 11 at the end of the conducting portion 14 is connected in series with the sensor cell 12 at the center portion of the conducting portion 14. Either one of the first electrode 23 or the second electrode 24 in the sensor cell 11 is directly connected in series with either one of the first electrode 23 or the second electrode 24 in the sensor cell 12. Further, the other one of the first electrode 23 or the second electrode 24 in the sensor cell 11 and the other one of the first electrode 23 or the second electrode 24 in the sensor cell 12 are connected to both terminals of the connector 13, respectively. That is, only when the sensor cell 11 and 12 are both rendered conductive, the two terminals of the connector 13 are rendered conductive.

If the passenger is seated on the seat in the proper attitude, the shoulder bones of the passenger depress both the sensor cells 11 and 12 of the seat sensor 1. In this case, therefore, the sensor cells 11 and 12 are rendered conductive, and both terminals of the connector 13 are rendered conductive. That is, the passenger detection ECU connected to the connector 13 detects that both terminals of the connector 13 are conductive and so determines that the passenger is seated on the seat 2.

When the seat sensor 1 has the parallel circuit shown in FIG. 4A, at least either the sensor cell 11 or the sensor cell 12 will be rendered conductive even if the passenger is not seated in the proper attitude. In this case, therefore, it is also determined that the passenger is seated on the seat 2.

Here, the passenger detection ECU may turn on or flash a warning light if the passenger who is seated on the seat 2 is not still wearing a seat belt. Further, passenger detection information detected by the passenger detection ECU may be transmitted to an airbag ECU that controls the start of a passenger protection device such as an airbag. When it is determined that the passenger is seated on the seat 2, the airbag ECU drives the passenger protection device in case the vehicle collides with an external object.

Further, when a luggage is placed on the seat 2, the two terminals of the connector 13 of the seat sensor 1 are rendered conductive. In the case of FIG. 4A, at least either one of the sensor cell 11 or the sensor cell 12 is conductive and, in the case of FIG. 4B, both the sensor cell 11 and the sensor cell 12 are conductive.

If the luggage placed on the seat surface of the seat 2 is a small, light thing such as a handbag, the sensor cells 11 and 12 will not be depressed by the luggage unless the luggage leans against the backrest 2a. In this case, therefore, the passenger detection ECU determines that no passenger is seated on the seat 2, as a matter of course.

If the luggage is short (small height), the sensor cells 11 and 12 positioned over the center portion of the backrest 2a in the up-and-down direction of the vehicle are not depressed by the luggage. In this case, too, therefore, the passenger detection ECU determines that no passenger is seated on the seat 2.

Here, if the luggage is tall, it is probable that the sensor cells 11 and 12 will be depressed. Usually, however, tall luggage is placed in a trunk compartment of the vehicle or is placed on a floor portion in a passenger compartment. Therefore, only short luggage are placed on the seat 2.

Accordingly, erroneous detection due to the luggage will be reduced to a sufficient degree. In the case of the circuit configuration in which the sensor cells 11 and 12 are connected in series as shown in FIG. 4B, both of them are rendered conductive. This further lowers the probability that the two sensor cells 11 and 12 are rendered conductive by the luggage. Namely, erroneous detection due to the luggage is more reliably reduced.

The first film 21 and the second film 22 both assume a linear form. If the first films 21 and the second films 22 are to be cut out in plural numbers from a big base film, the first film 21 and the second film 22 may be cut out being arranged in parallel. Therefore, only a very small proportion of the base film material is wasted. Namely, yield of the base film is improved as compared to the prior art, and films 21 and 22 of increased numbers can be formed from a piece of the base film as compared to the prior art. Therefore, the cost can be lowered.

Second Embodiment

Figure 5:
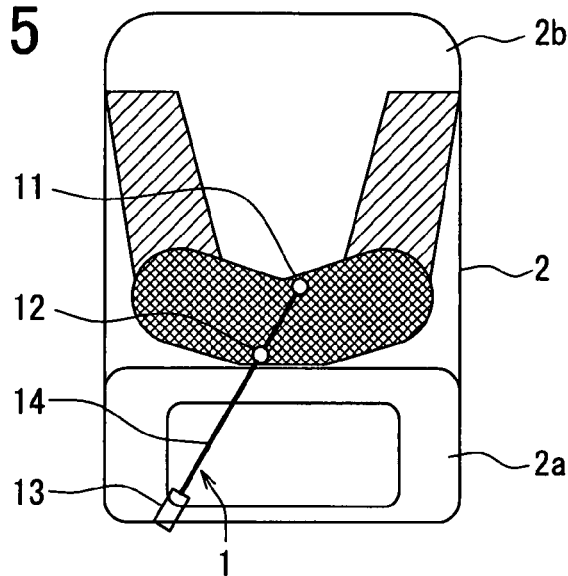
FIG. 5 is a top view of a seat sensor mounted on a seat, as viewed from the top side of the vehicle, according to a second embodiment of the present invention.

According to a second embodiment, as shown in FIG. 5, the seat sensor 1 is mounted on the bottom part (seat surface 2b) of the seat 2 (as viewed from the upper side of the vehicle). The distance between the sensor cell 12 and the connector 13 is longer than in the seat sensor 1 of the first embodiment.

Here, the shaded portion (hatching portion) in FIG. 5 represents an area where the seat surface 2b receives a large load when a passenger is seated on the seat 2. In particular, the dark portion (cross hatching) in the shaded portion is a portion corresponding to the buttocks of the passenger, and represents an area where the seat surface 2b receives a larger load than the shaded portion corresponding to the femoral portions of the passenger.

The seat sensor 1 is mounted on only the rear part of the seat surface 2b of the seat 2. The seat sensor 1 is arranged between the cushion of the seat surface 2b and the surface cloth. The sensor cells 11 and 12 of the seat sensor 1 are arranged at the central portion of the seat surface 2b in the left-and-right direction of the vehicle on the rear side of the vehicle. The seat sensor 1 is, further, arranged so as to face in a tilted direction in the back-and-forth direction of the vehicle and in the left-and-right direction of the vehicle. That is, the sensor cell 11 and the sensor cell 12 are arranged at positions deviated in the back-and-forth direction of the vehicle and in the left-and-right direction of the vehicle, that is, diagonally in the rear part of the seat surface 2b.

In this case, the sensor cells 11 and 12 of the seat sensor 1 are arranged at the buttocks of the passenger when he is seated on the seat 2 in a proper attitude. Therefore, when the passenger is seated on the seat 2 in the proper attitude, the sensor cells 11 and 12 are all rendered conductive. The connector 13 is arranged to be positioned on a tilted rear side of the vehicle relative to the sensor cells 11 and 12.

In this embodiment, as shown in FIG. 4B, the sensor cell 11 at the end of the conducting portion 14 is connected in series with the sensor cell 12 at the center portion of the conducting portion 14. Either one of the first electrode 23 or the second electrode 24 in the sensor cell 11 is directly connected in series with only one of the first electrode 23 or the second electrode 24 in the sensor cell 12. Further, the other one of the first electrode 23 or the second electrode 24 in the sensor cell 11 and the other one of the first electrode 23 or the second electrode 24 in the sensor cell 14 are directly connected to both terminals of the connector 13.

When the passenger is seated on the seat 2 in the proper attitude, the femoral portions of the passenger depress both the sensor cells 11 and 12 of the seat sensor 1. In this case, therefore, the sensor cells 11 and 12 are rendered conductive, and both terminals of the connector 13 are rendered conductive. That is, the passenger detection ECU connected to the connector 13 detects that both terminals of the connector 13 are conductive and determines that the passenger is seated on the seat 2.

When a luggage is placed on the seat 2, the two terminals of the connector 13 of the seat sensor 1 are rendered conductive in a state where the sensor cells 11 and 12 connected in series are both rendered conductive.

When the luggage such as a handbag is placed on the seat surface 2b of the seat 2, none of the sensor cells 11 and 12 will be rendered conductive if the luggage is lighter than the passenger. Therefore, neither of the two terminals of the connector 13 is rendered conductive. Namely, the passenger detection ECU determines that no passenger is seated on the seat 2.

Further, when, for example, the luggage is placed on the seat surface 2b in a manner that it leans against the backrest 2a, a large load may often be exerted on a particular dot-like narrow area on the seat surface 2b depending upon the shape and size of the luggage. Further, the luggage may often exert a large load on the backrest 2a in the parallel or vertical direction. In such a case, either one of the sensor cell 11 or 12 may be rendered conductive. Despite that either one of the sensor cell 11 or 12 is rendered conductive, however, the two terminals of the connector 13 are not rendered conductive unless the other cell 11 or 12 connected in series therewith is also rendered conductive. In this case, too, therefore, the passenger detection ECU determines that no passenger is seated on the seat 2.

As described above, the sensor cells 11 and 12 are arranged in the diagonal direction with respect to the back-and-forth direction of the vehicle, and are connected in series. Therefore, it is little probable that a large load is exerted by the luggage in this direction. This makes it possible to reliably reduce erroneous detection.

In the above first and second embodiments, two sensor cells 11 and 12 are used. However, a single sensor cell 11 or 12 may be used in reduced cost by forming the films in a linear shape. When used as a seat sensor and is arranged in the seat surface 2b of the seat 2, however, it becomes necessary to use two or more sensor cells to reduce erroneous detection. On the other hand, even when used as the seat sensor, a single censor cell may suffice if it is arranged in the backrest 2a of the seat 2.

Figure 9A:
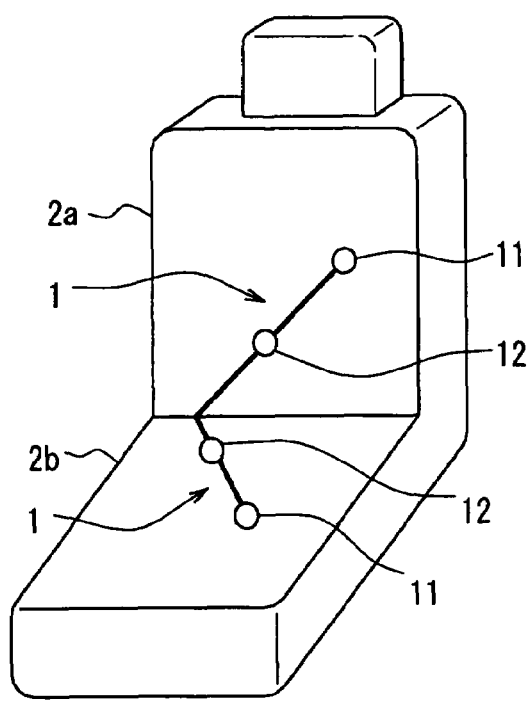
FIGS. 9A and 9B are perspective views of a seat sensor mounted on a seat of a vehicle according to a modification of the second embodiment.
Figure 9B:
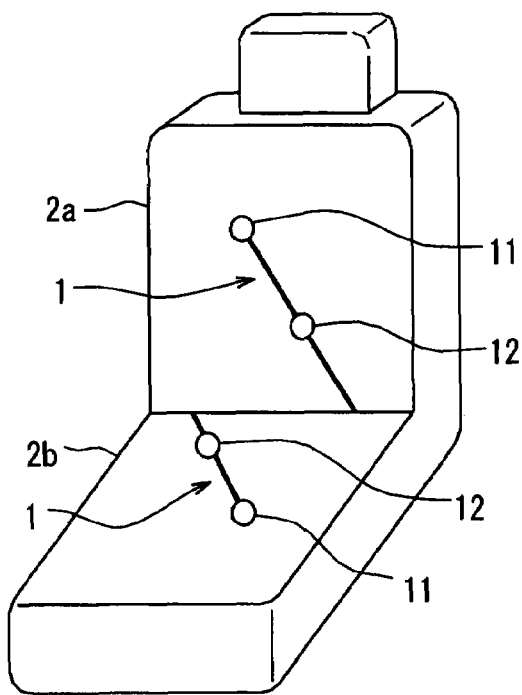

Further, as shown in FIGS. 9A and 9B, the seat sensor 1 having tow sensor cells 11 and 12 may be arranged on each of the backrest 2a and the seat surface 2b of each seat. Each seat sensor 1 is arranged to extend in the diagonal direction on the backrest 2a and the seat surface 2b. The sensor cells 11 and 12 are disposed only at positions where a larger compressive force is applied when a passenger is seated on the seat. Such positions may be the lower part of the backrest 2a and the rear part of the seat surface 2b.

Third Embodiment

Figure 6:
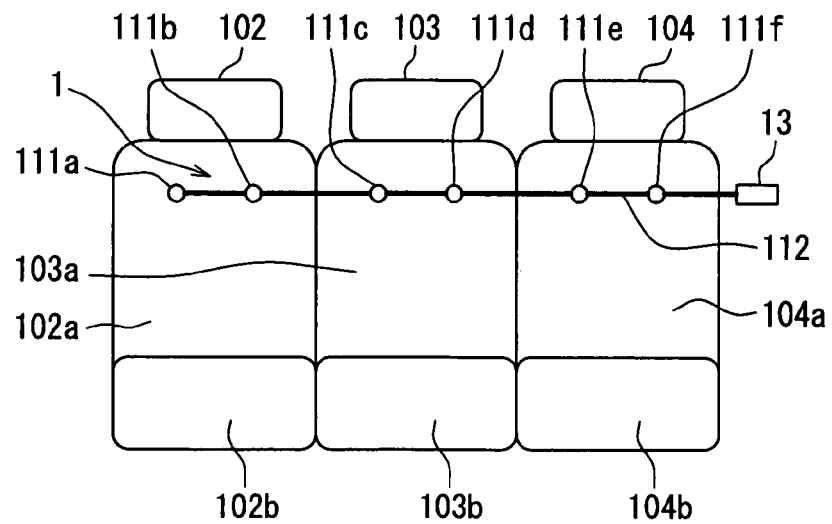
FIG. 6 is a schematic view of a seat sensor mounted on a plurality of seats that are integrally formed together as a seat of a vehicle, as viewed from the front side of the vehicle, according to a third embodiment of the present invention.

In a third embodiment, as shown in FIG. 6, a seat sensor 1 is mounted on a plurality of seats 102, 103 and 104 of a vehicle to detect if passengers are seated on the seats 102, 103 and 104. The seats 102, 103 and 104 may be integrated into a single seat for plural passengers.

The seat sensor 1 is constructed with six sensor cells 111a to 111f, a connector 13, and a conducting portion 112. That is, the seat sensor 1 as a whole is linearly formed, the sensor cells 111a to 111f being arranged maintaining nearly an equal distance, and the connector 13 is coupled to the terminals thereof. The detailed construction is the same as that of the seat sensor 1 of the first embodiment.

The seat sensor 1 is arranged on backrests 102a, 103a and 104a integrally formed together with the plurality of seats 102, 103 and 104 of the vehicle in parallel in the left-and-right direction. The seat sensor 1 is arranged on the backrests 102a, 103a and 104a at positions above the center portions in the up-and-down direction of the vehicle and being deviated toward the right side and left side from the center portions in the left-and-right direction of the vehicle. The two sensor cells 111a and 111b on the end side are mounted in the backrest 102a of the seat 102 on the right side of the vehicle (left side in the figure), the two sensor cells 111c and 111d at the center are mounted on the backrest 103a of the seat 103 at the center of the vehicle, and the two sensor cells 111e and 111f on the side of the connector 13 are mounted on the backrest 104a of the seat 104 on the left side of the vehicle.

The sensor cells 111a and 111b of the seat sensor 1 are arranged at the portions of the left-and-right shoulder bones of the passenger when the passenger is seated on the seat 102 on the right side of the vehicle in a proper attitude. The sensor cells 111c and 111d of the seat sensor 1 are arranged at the portions of the left-and-right shoulder bones of the passenger when the passenger is seated on the seat 103 at the center of the vehicle in the proper attitude. Further, the sensor cells 111e and 111f of the seat sensor 1 are arranged at the portions of the left-and-right shoulder bones of the passenger when the passenger is seated on the seat 104 on the left side of the vehicle in the proper attitude. When the passengers are seated on the seats 102 to 104 in the proper attitude, the sensor cells 111a to 111f arranged on the seats are all rendered conductive.

Figure 7A:
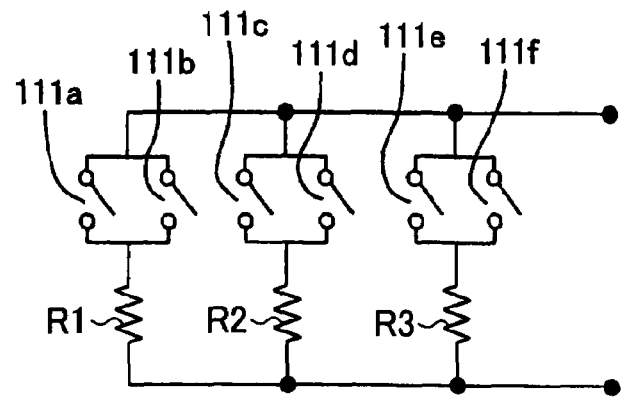
FIGS. 7A to 7D are circuit diagrams of the seat sensor according to the third embodiment.

The seat sensors 1 may be connected in any one of circuit configurations shown in FIGS. 7A to 7D. In the case of FIG. 7A, the sensor cells 111a to 111f are all connected in parallel. Further, the electric resistors R1, R2 and R3 of different resistances are disposed in the conducting portions 112 which are connected in series with the sensor cells 111a and 111b, 111c and 111d, 111e and 111f in the seats. In this case, the connector 13 has two external terminals.

Therefore, when, for example, the passenger is seated on the seat 102 on the right side of the vehicle, the sensor cell 111a or 111b is rendered conductive, and both terminals of the connector 13 are rendered conductive. The same holds even when the passenger is seated on the seat 103 or 104 at the center or on the left side of the vehicle. However, since the electric resistors R1, R2 and R3 have different resistances, the total electric resistance across the terminals of the connector 13 differs depending upon on which seat 102, 103 or 104 the passenger is seated. When a voltage is applied across the terminals of the connector 13, therefore, it is possible to determine on which seat 102, 103 or 104 the passenger is seated depending upon an electric current that flows in the seat sensor 1.

Figure 7B:
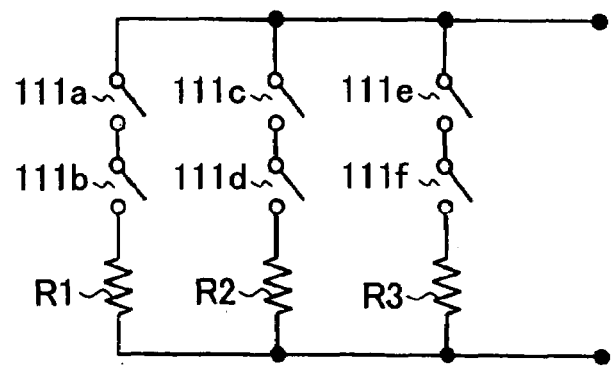

In the case of FIG. 7B, the sensor cells 111a to 111f in FIG. 7A are connected in series for each of the seats. In this case, for example, referring to the seat 102 on the right side of the vehicle, it is determined that the passenger is seated on the seat 102 only when the sensor cells 111a and 111b are rendered conductive. The same holds for other seats 103 and 104.

Figure 7C:
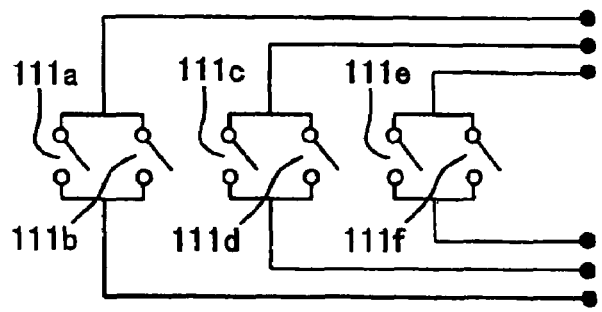
Figure 7D:
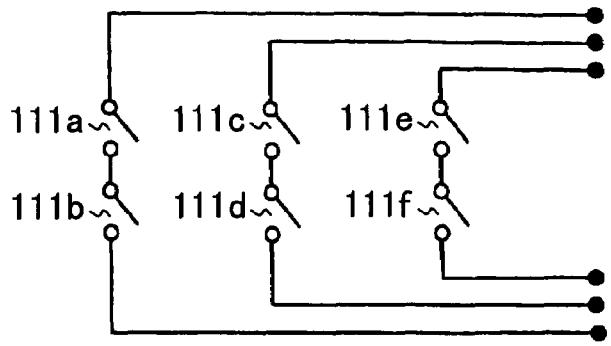

In the case of FIG. 7C, the sensor cells 111a and 111b, 111c and 111d, 111e and 111f arranged in the seats 102 to 103 are independent and not electrically connected, and the connector 13 has six external terminals. The sensor cells 111a to 111f in the respective seats 102 to 104 are connected in parallel. In the case of FIG. 7D, the sensor cells 111a to 111f in the respective seats 102 to 104 are connected in series, respectively. In the cases of FIGS. 7C and 7D, the circuit configuration in each seat 102 to 104 corresponds to the circuit configuration of FIGS. 4A and 4B, respectively.

Whichever of the above circuit configurations is employed, it is possible to detect on which one of the plurality of seats 102 to 104 the passenger is seated by using one seat sensor 1.

Fourth Embodiment

Figure 8:
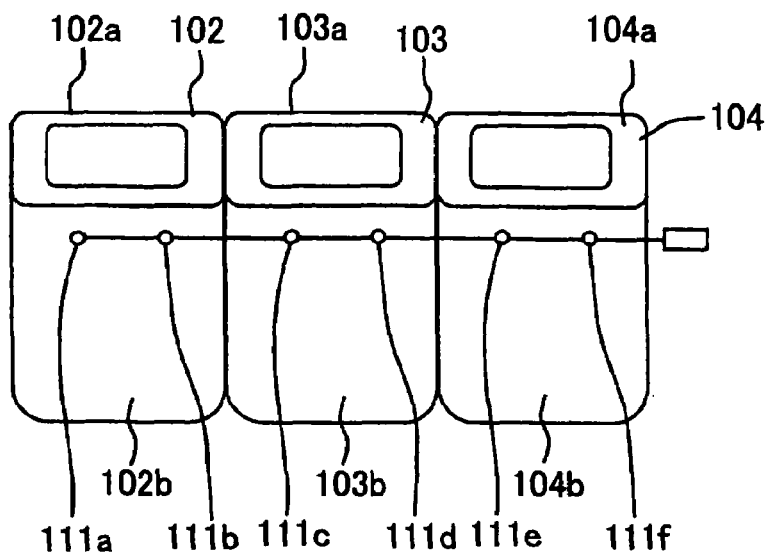
FIG. 8 is a schematic view of a seat sensor mounted on a plurality of seats that are integrally formed together as a seat of a vehicle, as viewed from the top side of the vehicle, according to a fourth embodiment of the present invention.

In a fourth embodiment, as shown in FIG. 8, the seat sensor 1 is arranged in the seat surfaces 102b, 103b and 104b of the seats 102 to 104.

The seat sensor 1 is mounted in the seat surfaces 102, 103b and 104b formed integrally with the seats 102, 103 and 104 in parallel in the left-and-right direction of the vehicle. The seat sensor 1 is arranged in the seat surfaces 102b, 103b, 104b on the rear side from the centers in the back-and-forth direction of the vehicle. The two sensor cells 111a and 111b on the end side are mounted in the seat surface 102b of the seat 102 on the right side of the vehicle, the two sensor cells 111c and 111d at the center are mounted in the seat surface 103b of the seat 103 at the center of the vehicle, and the two sensor cells 111e and 111f on the side of the connector 13 are mounted in the seat surface 104b of the seat 104 on the left side of the vehicle.

The sensor cells 111a and 111b of the seat sensor 1 are arranged at the portions of the buttocks of the passenger when the passenger is seated on the seat 102 on the right side of the vehicle in a proper attitude. The sensor cells 111c and 111d of the seat sensor 1 are arranged at the portions of the buttocks of the passenger when the passenger is seated on the seat 103 at the center of the vehicle in the proper attitude. Further, the sensor cells 111e and 111f of the seat sensor 1 are arranged at the portions of the buttocks of the passenger when the passenger is seated on the seat 104 on the left side of the vehicle in the proper attitude. When the passengers are seated on the seats 102 to 104 in the proper attitude, therefore, the sensor cells 111a to 111f arranged on the seats are all rendered conductive. The fourth embodiment may employ all of the circuit configurations described in the third embodiment. It is, therefore, possible to detect on which one of the plurality of seats 102 to 104 the passenger is seated by using one seat sensor 1.

What is claimed is:

1. A load sensor comprising:
   a first film formed in a linear shape and extending only in one straight line;
   a second film formed in the same shape as the first film and arranged to face the first film;
   sensor electrodes arranged between the first film and the second film to form a sensor cell, the sensor electrodes being normally spaced apart from each other and coming in contact with each other upon receiving a load;
   conducting electrodes arranged between the first film and the second film, and conductive to the sensor electrodes; and
   a connector coupled to ends of the first film and the second film to be conductive to the sensor electrodes via the conducting electrodes; wherein
   the sensor cell is arranged at a plurality of positions to form a plurality of sensor cells spaced apart in a direction of the one straight line of the linear shape; and
   the connector is positioned on the one straight line connecting the plurality of sensor cells.

2. The load sensor according to claim 1, wherein:
   the plurality of sensor cells are connected in series, and are arranged in a seat surface of a seat of a vehicle in a manner to extend in a diagonal direction of the seat surface to detect a passenger on the seat.

3. The load sensor according to claim 1, wherein:
   the plurality of sensor cells are connected in parallel or in series, and are arranged in a backrest of a seat of a vehicle, to detect a passenger on the seat.

4. The load sensor according to claim 1, wherein:
   the plurality of sensor cells are arranged in seat surfaces of a plurality of seats that are integrally formed together as a seat of the vehicle, and detect a passenger on the seat.

5. The load sensor according to claim 1, wherein:
   the plurality of sensor cells are arranged in the backrests of a plurality of seats that are integrally formed together as a seat of the vehicle, and detect a passenger on the seat.

6. The load sensor according to claim 1, further comprising a connector provided at one end of the linear shape, the plurality of sensor cells being arranged in a direction of the straight line opposite to the one end.

7. A load sensor comprising:
   a first electrode formed in a linear shape and extending in only one straight line;
   a second electrode formed in a same linear shape as the first electrode and arranged to face the first electrode in parallel; and
   a spacer provided between the first electrode and the second electrode to form a space therebetween; wherein
   the first electrode and the second electrode are enlarged at a plurality of positions to form a plurality of sensor cells, in which the first electrode and the second electrode contact each other in response to a compressive force applied thereto,
   the first electrode and the second electrode are formed in the linear shape so that the plurality of sensor cells are spaced apart from each other in a direction of the straight line of the linear shape, and
   the sensor cells are positioned only at a predetermined part of a seat, which receives more compressive force of a passenger than other parts of the seat.

8. The load sensor according to claim 7, wherein the predetermined part of the seat is at least one of a lower part of a backrest, an upper part of the backrest, and a rear part of a seat surface of the seat.

9. The load sensor according to claim 7, wherein the first electrode and the second electrode are arranged in a diagonal direction in the predetermined part of the seat.

10. The load sensor according to claim 7, wherein the first electrode and the second electrode are arranged in a left-and-right direction of the seat.

11. The load sensor according to claim 7, further comprising a connector provided at one end of the linear shape, the plurality of sensor cells being arranged in a direction of the straight line opposite to the one end.

* * * * *